Dec. 19, 1961    R. JOHNSON ET AL    3,013,690
MULTI JUNCTURE BOX FOR UNDERFLOOR DUCT SYSTEMS
Filed Feb. 17, 1959    2 Sheets-Sheet 1
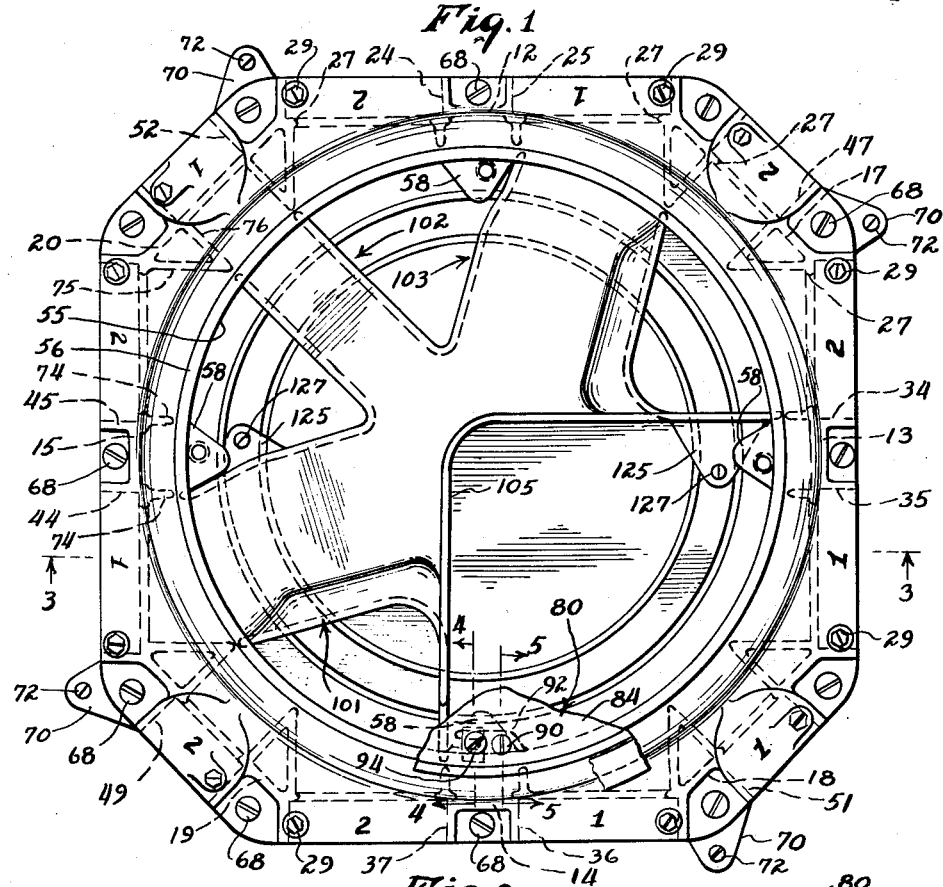
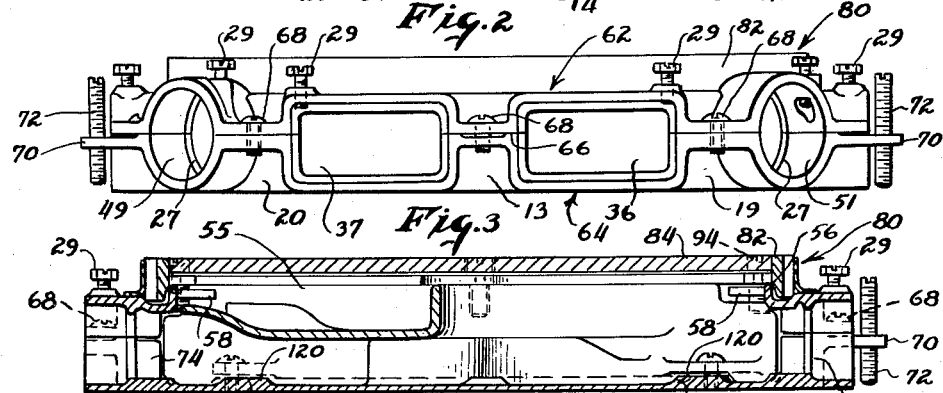
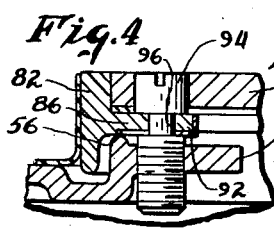
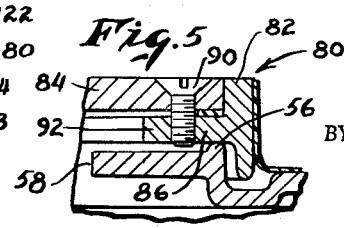
INVENTOR.
ROBERT JOHNSON
THOMAS E. HOSKINS
BY
ATTORNEYS Dec. 19, 1961   R. JOHNSON ET AL   3,013,690
MULTI JUNCTURE BOX FOR UNDERFLOOR DUCT SYSTEMS
Filed Feb. 17, 1959   2 Sheets-Sheet 2
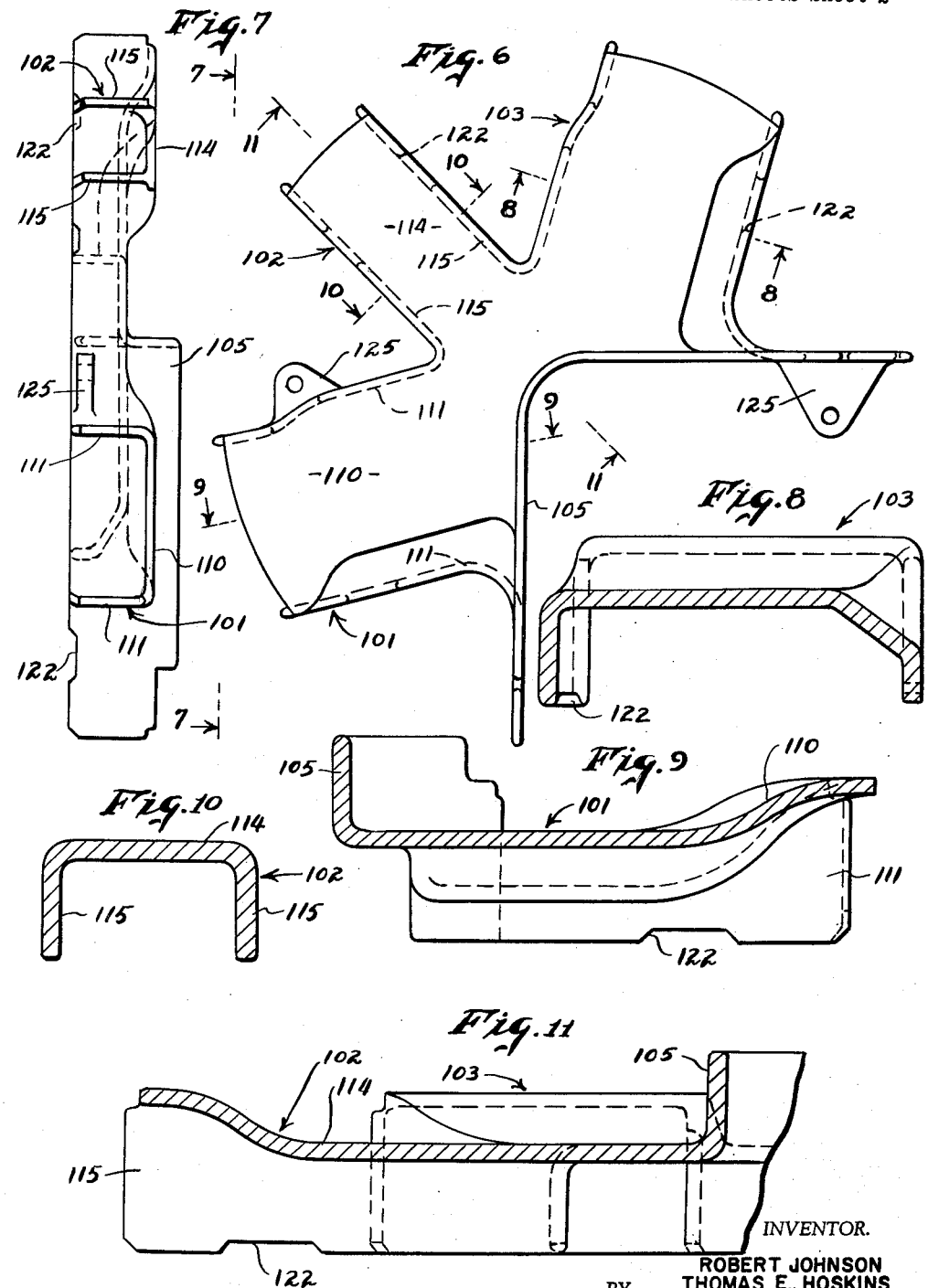
INVENTOR.
ROBERT JOHNSON
THOMAS E. HOSKINS
BY Emery, Whittemore, Sandoe & Dix
ATTORNEYS

United States Patent Office 3,013,690
Patented Dec. 19, 1961

3,013,690
MULTI JUNCTURE BOX FOR UNDERFLOOR DUCT SYSTEMS
Robert Johnson, Edgeworth, and Thomas E. Hoskins, Coraopolis, Pa., assignors, by mesne assignments, to H. K. Porter Company, Inc., Pittsburgh, Pa., a corporation of Delaware
Filed Feb. 17, 1959, Ser. No. 793,779
3 Claims. (Cl. 220—3.7)

This invention relates to junction boxes which are used for electrical duct systems, and especially under-floor duct systems.

Under-floor duct systems are used both for electric power distribution and for electric communication circuits. It is convenient to be able to bring the ducts for the different systems to common junction boxes, but Underwriters' regulations require that the wires for different potential circuits be physically separated from one another in the junction boxes by partitions. It had been the practice, therefore, to provide partitions in junction boxes arranged so that certain openings through side walls of a box communicate with one another, and other openings through the side walls of the box communicate with one another but not with any of the openings of the first group.

When the ducts are installed, the wires are fished through the different ducts and junction boxes in accordance with the wiring diagram of the building; the boxes having been located in accordance with the wiring diagram. If any box is improperly oriented, however, the wrong openings will be in communication with the ducts from other boxes and the incorrectly-oriented box cannot be connected into the wiring system with the other boxes and ducts. When mistakes have been made in placing a particular box in a floor during building construction, it has been necessary to either remove the box and replace it or to cut out the partitions in the box and fabricate new partitions, both of these procedures being extremely costly.

In addition to the improper orientation of a box in a floor, there is another hazard in that the partitions of boxes are sometimes placed in the box incorrectly and even though the box is properly oriented according to its outside marking legends, it may be impossible correctly to wire the system through that box because of the incorrect assembly of the box at the factory. This requires cutting the box out of the floor and replacing it, or cutting out the partitions from within the box and fabricating new partitions, the expense being the same as when the box is incorrectly oriented.

It is an object of this invention to provide an improved junction box having a partition assembly constructed and so correlated with the openings through the box that the partition assembly can be shifted into different positions so that it does not make any difference how the box is oriented in the floor so long as it is in position to connect with the ducts of the electrical systems.

In its broader aspects, the invention comprises a junction box having openings through the side walls and having a partition assembly which puts openings of different groups in communication with one another while maintaining separation between the different groups of openings; and in which the partition assembly is movable into different positions so that the group of openings which was on one side of the partition is put into communication with the other side of the partition while that group which was formerly on the other side is put into communication on the first side of the partition.

In the preferred construction of the invention, the partition assembly is constructed so that it rotates about a center and the openings through the sides of the box are constructed with inwardly extending walls which terminate at the circumference of a circle of only slightly larger diameter than a circle in which the partition assembly rotates. Detachable fastening means are provided for holding the partition assembly in selected positions to which it may be moved.

Other objects, features and advantages of the invention will appear or be pointed out as the description proceeds.

In the drawing, forming a part thereof, in which like reference characters indicate corresponding parts in all the views, FIGURE 1 is a top plan view of a junction box made in accordance with this invention, and with the cover of the box broken away;

FIGURE 2 is an end view of the box shown in FIGURE 1;

FIGURE 3 is a sectional view taken on the line 3—3 of FIGURE 1;

FIGURES 4 and 5 are fragmentary detail views taken on the lines 4—4 and 5—5, respectively, of FIGURE 1;

FIGURE 6 is a top plan view of the partition assembly removed from the box;

FIGURE 7 is an end view of the partition assembly shown in FIGURE 6, the view being taken on the line 7—7 of FIGURE 6; and FIGURES 8, 9, 10 and 11 are views taken on the lines 8—8, 9—9, 10—10, and 11—11, respectively, of FIGURE 6.

FIGURE 1 shows a box having four sides 12, 13, 14 and 15 located in planes at right angles to one another; and having four intervening and shorter sides 17, 18, 19 and 20 which are also in planes at right angles to one another and at 45° to the planes of the longer sides 12, 13, 14 and 15. Thus, the junction box has a total of eight sides. There are openings for ducts through the long sides 12, 13, 14 and 15; and there are openings for conduits through the shorter sides 17, 18, 19 and 20. This is a conventional arrangement but for purposes of this invention, the term "duct" will be used in a generic sense to describe either a duct or a conduit since it is immaterial, insofar as this invention is concerned, which openings in the box are used for ducts and which for conduits, or whether all of the openings are the same.

There are two openings through the side wall 12. These include an opening 24 and an opening 25. In the illustrated construction, both of these openings are the same size and they are spaced from one another lengthwise of the side wall 12. Each of the openings 24 and 25 has a shoulder 27 against which an end face of a duct abuts to limit the extent to which the duct can be inserted into the openings 24 and 25. There is a set screw 29 threaded through the top of the box and into each opening 24 and 25, and this set screw can be screwed down against a duct to lock the duct in the opening in accordance with conventional practice.

There are other openings 34 and 35 through the side wall 13. These openings correspond to openings 24 and 25 and are preferably of the same size and shape. In the side wall 14 there are openings 36 and 37, corresponding to the openings in the walls 12 and 13, and there are other corresponding openings 44 and 45 in the wall 15. There is a legend "1" on the top of the box above each of the openings 25, 35, 37 and 45. There is a legend "2" over each of the openings 24, 34, 36 and 44.

These legends mean that the openings which are designated by the legend "1" communicate with one another within the box but do not communicate with the other openings indicated by the legend "2." Similarly, the openings indicated by the legend "2" communicate with one another within the box but do not communicate with the other openings indicated by the legend "1."

There is an opening 47 through the wall 17 and a corresponding opening 49 through the wall 19. These openings 47 and 49 are of circular cross section and they have shoulders 27 for limiting the extent to which a duct or conduit can be inserted into the opening; and they have set screws 29 for locking the ducts to the box after the ducts are inserted. These openings 47 and 49, at opposite sides of the box, are marked on top of the box with the legend "2" to indicate that they communicate with the second group of duct openings within the box, that is, with the duct openings 24, 34, 36 and 44.

The other sides 18 and 20 of the box have openings 51 and 52, corresponding to the openings 47 and 49, but marked with the legend "1" to indicate their communication with the first group of duct openings, that is, the openings 25, 35, 37 and 45.

There is a large circular opening 55 through the top wall of the box and an upstanding rim 56 extends from the top of the box around the entire circumference of the opening 55. At angularly-spaced regions around the rim 56, there being four such regions in the illustrated construction, there are lugs 58 extending inwardly and with openings for receiving screws for purposes which will be explained.

The box is made in two parts, as is best shown in FIGURE 2. These include an upper part 62 and a lower part 64 connected together along a separation plane 66 by screws 68 at spaced regions around the perimeter of the box, as shown in FIGURE 1. Each of the screws 68 passes through an unthreaded opening in the upper portion 62 and threads into a corresponding opening in the lower portion 64. Other means can be employed for holding the upper and lower portions of the box together, and it will be understood that the screws 68 are merely representative of fastening means connecting the upper and lower portions.

The openings through the side walls of the box are formed partly in the upper portion 62 and partly in the lower portion 64. There are lugs 70 extending from the sides of the box and these lugs are threaded to receive leveling screws 72. There are inwardly-extending walls 74, 75 and 76 forming continuations of the sides of the various openings in the side walls of the box inward from the shoulders 27; and these inwardly-extending walls 74, 75 and 76 are formed partly on the upper portion 62 and partly on the lower portion 64, in the preferred construction. All of these inwardly-extending walls 74, 75 and 76 terminate around a circle which is slightly larger in diameter than the circular opening 55.

The box has a cover 80 consisting of a ring 82 and a disk 84. The ring 82 has an inwardly-extending flange 86 which rests on top of the rim 56. A portion of the ring 82 extends downwardly outside of the rim 56 and another portion extends upwardly above the flange 86. A gasket 88 is secured to the top of the flange 86, and the disk 84 extends upwardly to a level flush with the top of the ring 82. The disk 84 is attached to the ring 82 by screws 90 extending through unthreaded countersunk holes in the disk 84 and threading into lugs 92 which extend radially inward from the flange 86.

The cover 80 is attached to the top of the junction box by screws 94. These screws have grooves of reduced diameter engaging slots 96 in the lugs 92. The faces on opposite sides of the reduced-diameter grooves prevent the screws 94 from moving either upwardly or downwardly with respect to the lugs 92. The screws 94 thread into other lugs 58 through threaded openings. Since the lugs 92 cannot move axially with respect to the screws 94, it will be evident that any up-and-down movement of the screws 94 in the lugs 58 causes the entire cover 80 to move up and down. In this way the cover is leveled to the screed line of the floor before the concrete is poured.

Each of the screws 94 is prevented from moving transversely in a direction to come out of its slot 96 by a clip 97 which has a slotted end that slides over the reduced diameter portion of the screw 94 just below the lug 92. This construction is disclosed in detail in the patent application of Robert Johnson Serial No. 578,617, filed Apr. 17, 1956. In the construction of the present invention it is merely representative of means of holding the screw 94 in assembled relation with the lug 92.

FIGURE 6 shows the partition assembly which is used inside the box to separate the two groups of duct openings from one another while leaving the openings of each group in communication. In the construction illustrated, the partition assembly is a one-piece casting, and preferably made of metal, though it can be made in other ways if desired.

The partition assembly includes three channel portions 101, 102, and 103. These channel portions meet at the middle of the partition assembly and they connect with a partition wall 105. FIGURE 7 shows an end view of the channel portion 101. This channel portion includes a top wall 110 and two side walls 111. No bottom wall is necessary since the chamber formed by the walls 110 and 111 is closed at the bottom by the bottom wall of the box. The end of the channel formed by the walls 110 and 111 has a cross section which is substantially equal to one of the elongated duct openings of the side walls of the junction box.

In FIGURE 1, the channel portion 101 is shown in register with the opening 44. It will be evident that if the partition assembly is rotated through an angle of 90° in a clockwise direction, the channel portion 101 will register with the opening 24.

Referring again to FIGURE 7, the channel portion 102 includes a top wall 114 and side walls 115. The height and width of the end of the channel formed by this top wall 114 and these side walls 115 is substantially equal to the diameter of one of the smaller openings through the side walls of the junction box beyond the shoulders of these side walls. In FIGURE 1 the channel portion 102 is shown in register with the opening 52. Rotation of the partition assembly through an angle of 90° in a clockwise direction will bring the channel portion 102 into register with the opening 47.

The channel portion 103 is similar to the channel portion 101 already described. Since the outer ends of the channels formed by these channel portions 101, 102 and 103 are large enough to embrace the entire opening through the side wall with which each channel portion registers, it will be evident that any wires passing through these side wall openings will be deflected downwardly under the top walls of the channel portions of the partition assembly; and where the channel portions 101 and 102 and 103 come together at the mid region of the partition assembly, wires can pass from any one of these channel portions 101, 102 and 103 to any other one.

Beyond the outer ends of the channel portions 101, 102 and 103, where they are adjacent to the inwardly-extending walls from the sides of the box, the top surface of the partition assembly is as high as the openings into the box, as already explained, but the top wall slopes downwardly as it extends inwardly, and the mid region of the top wall is at a level substantially half-way between the top and bottom walls of the junction box.

The top wall of the partition assembly terminates at a ridge 105. This ridge extends upwardly from the top wall, but all of the channel portions 101, 102 and 103 below the top of the partition assembly open into the section of the box beyond the ridge 105. Thus, wires from any of the channel portions 101, 102 and 103, can extend into the inside of the junction box beyond the ridge of 105 and within this portion of the box the entire height of the box is open to the electrical system having its conductors extending through the channel portions 101, 102 and 103.

Referring again to FIGURE 1, it will be evident that all of the openings of the first group, that is, the openings having the legend "1" above them, communicate with the portion of the box interior which is under the partition assembly and which is behind the ridge 105. All of the openings in the box which are designated by the legend "2" communicate with the portion of the box above the top of the partition assembly and outside of the space which is partitioned off by the ridge 105.

From a study of FIGURE 1, it will be apparent that by turning the partition assembly through an angle of 90° about its center, a reverse condition will exist, that is, all of the openings indicated by the legends "1" will now communicate with one another above the partition assembly and outside of the section which is partitioned off by the ridge 105; whereas the openings indicated by the legend "2" will communicate with the channel portions 101, 102 and 103 under the partition assembly and within the portion of the box enclosed behind the ridge 105. Thus it is impossible improperly to orient the box of this invention in a floor because if it is found that one box has been oriented differently from other boxes, the partition assembly can be rotated through an angle of 90° to make the box match with the other boxes.

Various means can be employed for rotatively supporting the partition assembly in the box. In the preferred construction, there is a track 120 formed on the bottom of the box and extending upwardly from the surface of the bottom wall. In each part of the partition assembly which rests on the bottom of the box there is a groove 122 in position to be engaged by the track 120. The surface of these grooves 122 provide bearings which act as track-riders and these bearing surfaces move along the track 120 whenever the partition assembly is rotated.

In order to hold the partition assembly in any desired adjusted position within the junction box, there are lugs 125 extending from portions of the partition assembly; and there are screws 127 which extend through holes in these lugs 125 and which thread into openings in the bottom wall of the box. These lugs 125 and screws 127 are merely representative of releasable means for holding the partition assembly in adjusted position within the junction box.

The preferred embodiment of the invention has been illustrated and described, but changes and modifications can be made and some features can be used in different combinations without departing from the invention as defined in the claims.

What is claimed is:

1. In a junction box for different circuits which are kept separated from one another, said box having a bottom and having side walls with at least three openings through the side walls in each quadrant of the box therein for receiving conduits from which wires pass into the interior of the junction box, and a partition assembly within the box having portions that divide the box into two different compartments for the wires of the different circuits, the assembly having passages that put certain selected wall openings in communication with a first compartment of the box while other wall openings, located between said selected wall openings communicate with a second compartment of the box, the partition being rotatable in the box into different positions about a center axis of the box to change the selection of openings with which said passages communicate, the improvement which comprises a single unitary partition assembly, a bearing surface in the box and on which said partition assembly is rotatable as a unit, said assembly having a partition wall extending upward from the bottom of the box and having opposite ends of said wall adjacent to the side walls of the box at spaced locations between which the side walls have at least three openings therein, said partition wall extending inwardly from its ends toward the center portion of the box and extending for substantial distances away from the side walls and forming, with said side walls and the bottom of the box, a compartment into which said group of openings open, the partition assembly including also at least three channel portions with their open sides facing downwardly and with the edges of the open sides of the channel portions adjacent to the bottom of the box, each of said channel portions having its outer end adjacent to and in register with an opening through said side wall and the channel portion extending inwardly at an acute angle to the next adjacent channel portion and being joined to the adjacent channel portion before reaching the center of the box and the passages through the channel portions merging with one another before reaching the center of the box, the merging passages opening through the partition wall and into said compartment, and the outer ends of said channel portions that are adjacent to a side wall being spaced from one another around the periphery of the box and having other openings through the box side walls between them, and a cover on the box adjacent to the upper end of the partition wall but spaced a substantial distance above the channel portions of the partition.

2. The junction box described in claim 1 and in which the inner ends of the openings through the side walls are located in a circle about the center of the box, and there is a circular ridge within the box and on which the partition assembly rotates to change the selection of wall openings that are in communication with the channel passages and said compartment.

3. The junction box described in claim 1, and in which the outside of the box is polygonal and the openings through the walls of the box terminate at their inner ends around the circumference of a circle.

References Cited in the file of this patent

UNITED STATES PATENTS

| | | |
|---|---|---|
| 1,626,570 | Walker | Apr. 26, 1927 |
| 2,043,648 | Bissell et al. | June 9, 1936 |
| 2,063,569 | Walker | Dec. 8, 1936 |
| 2,919,827 | Cubberley | Jan. 5, 1960 |

FOREIGN PATENTS

| | | |
|---|---|---|
| 55,377 | Norway | July 1, 1935 |